(12) United States Patent
Cheng

(10) Patent No.: US 10,620,649 B2
(45) Date of Patent: Apr. 14, 2020

(54) CURRENT REGULATING CIRCUIT AND METHOD

(71) Applicant: Winbond Electronics Corp., Taichung (TW)

(72) Inventor: Chi-Lin Cheng, Changhua County (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/441,197

(22) Filed: Jun. 14, 2019

(65) Prior Publication Data

US 2019/0384335 A1    Dec. 19, 2019

(30) Foreign Application Priority Data

Jun. 14, 2018   (TW) .............................. 107120509 A

(51) Int. Cl.
*G05F 1/56* (2006.01)
*H02M 1/00* (2006.01)

(52) U.S. Cl.
CPC ....... *G05F 1/56* (2013.01); *H02M 2001/0032* (2013.01); *H02M 2001/0035* (2013.01)

(58) Field of Classification Search
CPC .............. H02M 2001/0032; H02M 2001/0035
USPC ............................. 323/273, 312, 908; 361/18
See application file for complete search history.

(56) References Cited

U.S. PATENT DOCUMENTS

| | | | |
|---|---|---|---|
| 5,570,255 A * | 10/1996 | Hirata ...................... | H02H 7/18 361/18 |
| 6,639,390 B2 * | 10/2003 | Perez ...................... | G05F 1/565 323/276 |
| 6,806,690 B2 | 10/2004 | Xi | |
| 6,809,560 B1 * | 10/2004 | Wrathall ............. | H02M 3/1588 327/108 |
| 7,652,455 B2 | 1/2010 | Demolli | |
| 7,990,120 B2 * | 8/2011 | Leonard ................ | H02M 3/156 323/224 |
| 9,146,569 B2 | 9/2015 | Li et al. | |
| 2002/0149398 A1 * | 10/2002 | Ingino, Jr. ............... | G05F 1/575 327/52 |
| 2009/0072879 A1 * | 3/2009 | Parris ................. | H03K 19/0019 327/333 |
| 2009/0085535 A1 * | 4/2009 | Wei ........................ | H02M 3/156 323/272 |
| 2009/0278586 A1 * | 11/2009 | Chen ...................... | H03K 17/22 327/333 |
| 2014/0266105 A1 * | 9/2014 | Li ........................... | G05F 1/565 323/280 |

\* cited by examiner

*Primary Examiner* — Gary A Nash
(74) *Attorney, Agent, or Firm* — Muncy, Geissler, Olds & Lowe, P.C.

(57) ABSTRACT

A current regulating circuit is provided in the invention. The current regulating circuit includes a first inverter, a second inverter, a PMOS, an NMOS and a capacitor. The first inverter receives a control signal. The second inverter receives the control signal. A first gate of the PMOS is coupled to the first inverter. The NMOS is coupled to the PMOS and a second gate of the NMOS is coupled to the second inverter. The capacitor is coupled to the PMOS and the NMOS at a node, and is coupled to a low dropout regulator at a reference node.

10 Claims, 5 Drawing Sheets

CURRENT REGULATING CIRCUIT AND METHOD

CROSS REFERENCE TO RELATED APPLICATIONS

This Application claims priority of TW Patent Application No. 107120509 filed on Jun. 14, 2018, the entirety of which is incorporated by reference herein.

BACKGROUND OF THE INVENTION

Field of the Invention

The invention generally relates to current regulating technology, and more particularly, to current regulating technology for increasing the response speed of a low dropout regulator (LDO) for switching from a standby mode to an active mode by a current regulator.

Description of the Related Art

In the operation of the low dropout regulator (LDO), the low dropout regulator may have its corresponding active mode and standby mode (power-saving mode).

However, in the current low dropout regulator, when the low dropout regulator is switched from the standby mode (the current of the inner amplifier of the low dropout regulator is small) to the active mode (the current of the inner amplifier of the low dropout regulator is great), it may take more time.

FIG. 1 is a schematic diagram of the voltage levels of the control signal Vint_en and the reference node Node_i-ref according to the prior art. As shown in FIG. 1, when the control signal Vint_en is changed from a low voltage level to a high voltage level (i.e. the low dropout regulator is switched from the standby mode to the active mode), the voltage level of the reference node Node_i-ref of the low dropout regulator is changed from a low voltage level to a target voltage level. However, because the speed of the voltage level of the reference node Node_i-ref of the low dropout regulator changing from a low voltage level to a target voltage level is very slow, when the low dropout regulator is switched from the standby mode to the active mode, the variance of the current of the inner amplifier of the low dropout regulator will be very slow too, i.e. the response speed of the low dropout regulator is very slow.

Therefore, when the back-end circuit (or external circuit) needs to pump a large current, because the response speed of the low dropout regulator switching from the standby mode to the active mode is too slow, a large voltage drop may occur instantaneously. As a result, the wrong operation of the logic circuits connected to the output of the low dropout regulator may occur

BRIEF SUMMARY OF THE INVENTION

The invention provides a current regulating technology to overcome the problems described above. The current regulating technology is more particularly related to the current regulating circuit and method for increasing the response speed of a low dropout regulator for switching from a standby mode to an active mode by a current regulator.

An embodiment of the invention provides a current regulating circuit. The current regulating circuit comprises a first inverter, a second inverter, a PMOS, an NMOS and a capacitor. The first inverter receives a control signal. The second inverter receives the control signal. A first gate of the PMOS is coupled to the first inverter. The NMOS is coupled to the PMOS and a second gate of the NMOS is coupled to the second inverter. The capacitor is coupled to the PMOS and the NMOS at a node, and is coupled to a low dropout regulator at a reference node.

An embodiment of the invention provides a current regulating method. The current regulating method is applied to a current regulating circuit. The current regulating method comprises the steps of when a control signal is changed from a first level to a second level, enabling a PMOS of the current regulating circuit and disabling an NMOS of the current regulating circuit, wherein the PMOS and the NMOS are coupled to a node; and pulling the voltage level of the node to a high level to increase the speed of pulling the voltage level of a reference node to a target voltage level, wherein the current regulating circuit and a low dropout regulator are coupled to the reference node.

Other aspects and features of the invention will become apparent to those with ordinary skill in the art upon review of the following descriptions of specific embodiments of the current regulating circuit and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
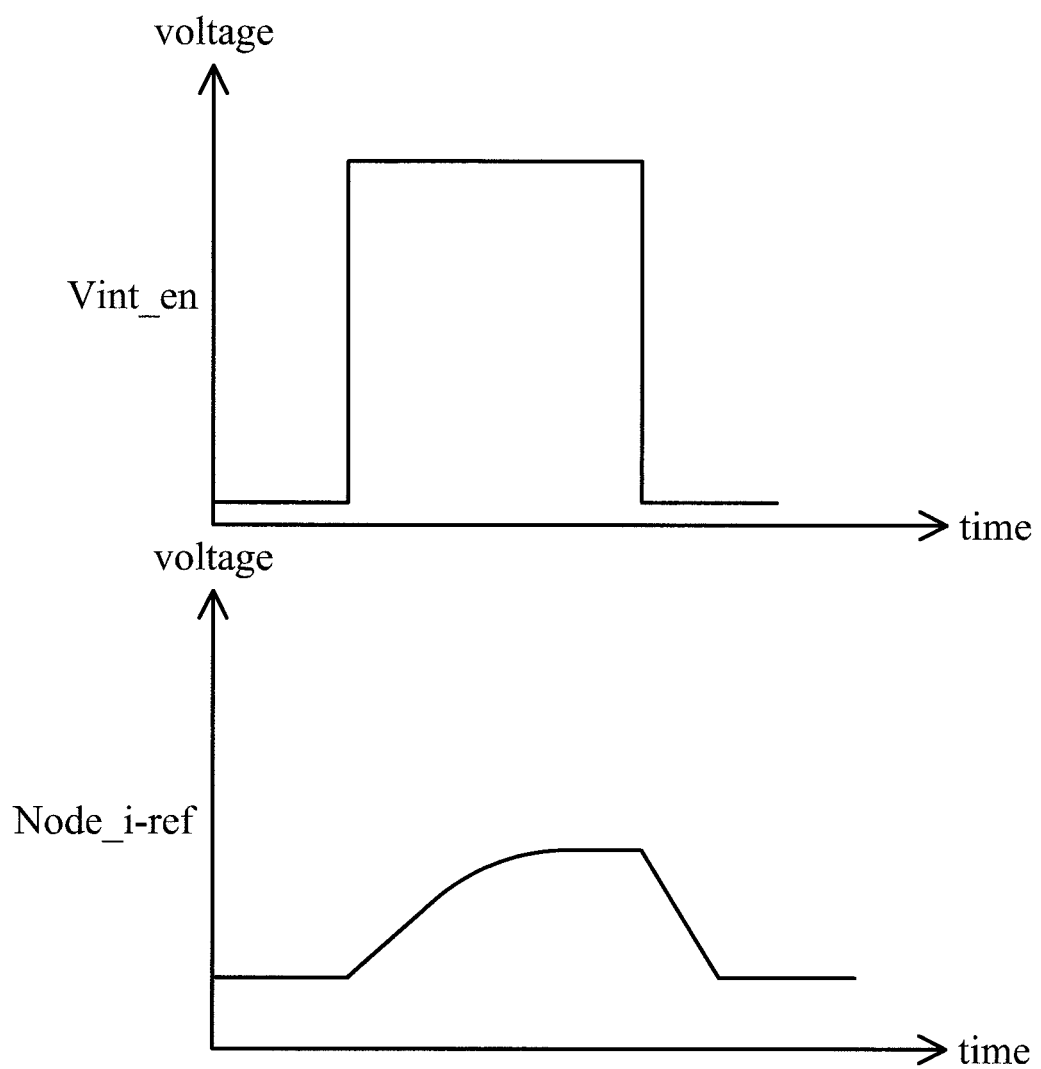
FIG. 1 is a schematic diagram of the voltage levels of the control signal Vint_en and the reference node Node_i-ref according to a prior art.
Figure 2:
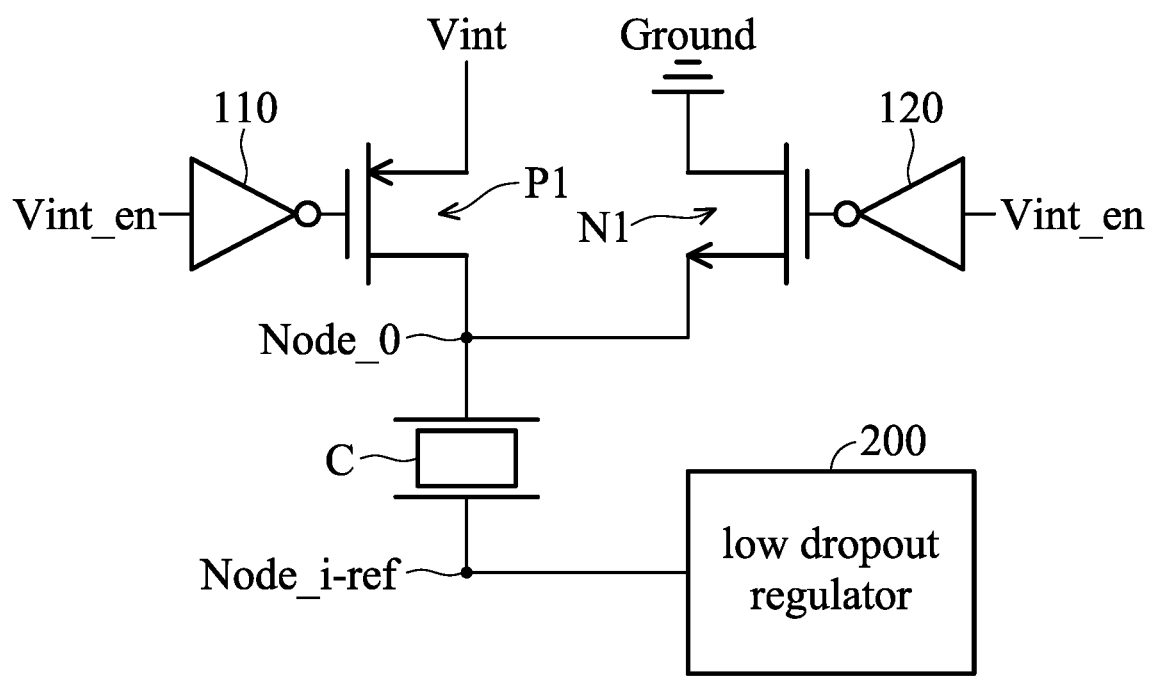
FIG. 2 is a circuit diagram of a current regulating circuit 100 according to an embodiment of the invention.

FIG. 2 is a circuit diagram of a current regulating circuit 100 according to an embodiment of the invention. As shown in FIG. 2, the current regulating circuit 100 may comprise a first inverter 110, a second inverter 120, a first PMOS P1, a first NMOS N1 and a capacitor C. Note that, in order to clarify the concept of the invention, FIG. 2 presents a simplified circuit diagram in which only the elements relevant to the invention are shown. However, the invention should not be limited to what is shown in FIG. 2. The current regulating circuit 100 may comprise other elements. In addition, as shown in FIG. 2, the current regulating circuit 100 may be coupled to a low dropout (linear) regulator (LDO) 200.

According to an embodiment of the invention, the capacitor C may comprise a plurality of capacitors. According different requirements of the capacitance value, the capacitors with different sizes may be configured in the capacitor C.

As shown in FIG. 2, the first inverter 110 is coupled to the first gate of the first PMOS P1, and the first inverter 110 may receive the control signal Vint_en from an external control circuit (not shown in figures). In addition, the second inverter 120 is coupled to the second gate of the first NMOS N1, and the second inverter 120 may also receive the control signal Vint_en from the external control circuit (not shown in figures).

In addition, as shown in FIG. 2, the first drain of the first PMOS P1 is coupled to the capacitor C at the node Node_0, and the first source of the first PMOS P1 may receive an input voltage Vint, and the second source of the first NMOS N1 is coupled to the capacitor C at the node Node_0, and the second source of the first NMOS N1 is coupled to a ground Ground. In addition, the capacitor C of the current regulating circuit 100 may be coupled to the low dropout regulator 200 at the reference node Node_i-ref.

Figure 3:
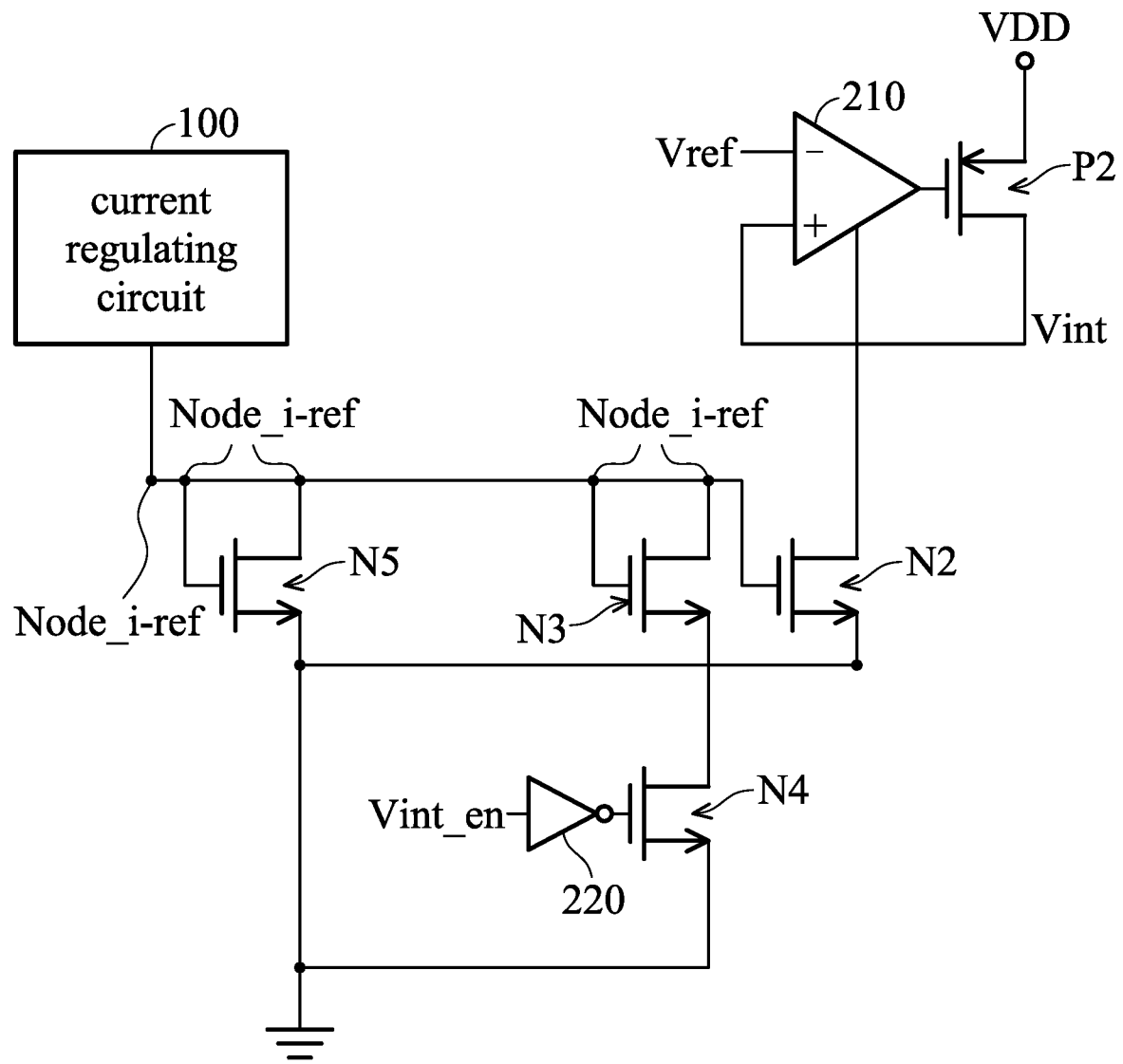
FIG. 3 is a circuit diagram of a low dropout regulator 200 according to an embodiment of the invention.

FIG. 3 is a circuit diagram of a low dropout regulator 200 according to an embodiment of the invention. As shown in FIG. 3, the low dropout regulator 200 comprises an amplifier 210, a second PMOS P2, a second NMOS N2, a third NMOS N3, a fourth NMOS N4, a fifth NMOS N5 and a third inverter 220. Note that, in order to clarify the concept of the invention, FIG. 3 presents a simplified circuit diagram in which only the elements relevant to the invention are shown. However, the invention should not be limited to what is shown in FIG. 3. The low dropout regulator 200 may comprise other elements. In addition, the nodes in the same line with the reference node Node_i-ref can be regarded as reference node Node_i-ref.

As shown in FIG. 3, the external control circuit (not shown in figures) may also transmit the control signal Vint_en to the low dropout regulator 200 to control the low dropout regulator 200 to operate in a standby mode or an active mode. For example, when the control signal Vint_en is in a first level (e.g. a low level), the low dropout regulator 200 may operate in the standby mode, and when the control signal Vint_en is in a second level (e.g. a high level), the low dropout regulator 200 may operate in the active mode.

In the embodiment of the invention, when the low dropout regulator 200 is in the standby mode, the first path (i.e. the third NMOS N3 and the fourth NMOS N4) of the low dropout regulator 200 and the second path (i.e. the fifth NMOS N5) of the low dropout regulator 200 will be enabled to put the voltage level of the reference node Node_i-ref at a low level. When the low dropout regulator 200 is in the active mode, the first path (i.e. the third NMOS N3 and the fourth NMOS N4) of the low dropout regulator 200 will be disabled and the second path (i.e. the fifth NMOS N5) of the low dropout regulator 200 will be enabled to put the voltage level of the reference node Node_i-ref be at a high level.

According to an embodiment of the invention, when the control signal Vint_en received by the first inverter 110 and the second inverter 120 is first level (e.g. low level), the first PMOS P1 will be disabled, the first NMOS N1 will be enabled, and the voltage level of the node Node_0 will be in a low level. Because the first PMOS P1 is disabled and the first NMOS N1 is enabled, the current regulating circuit 100 is not enabled when the control signal Vint_en is first level (e.g. low level), i.e. the current regulating circuit 100 does not regulate the voltage level of the reference node Node_i-ref. In addition, when the control signal Vint_en received by the first inverter 110 and the second inverter 120 is second level (e.g. high level), the first PMOS P1 will be enabled, the first NMOS N1 will be disabled, and the voltage level of the node Node_0 will be in a high level. Because the first PMOS P1 is enabled and the first NMOS N1 is disabled, the current regulating circuit 100 will be enabled when the control signal Vint_en is second level (e.g. high level) in order to regulate the voltage level of the reference node Node_i-ref (i.e. increase the speed of pulling the voltage level of the reference node Node_i-ref to a target voltage level).

Therefore, according to an embodiment of the invention, when the control signal Vint_en is changed from the first level (low level) to the second level (high level), the first PMOS P1 is enabled, the first NMOS N1 is disabled, and the voltage level of the node Node_0 is changed from the low level to the high level. When the voltage level of the node Node_0 is changed from the low level to the high level, the capacitor C is utilized to process the capacitive-coupling for the voltage level of the reference node Node_i-ref to increase the speed of pulling the voltage level of the reference node Node_i-ref to a target voltage level. When the speed of pulling the voltage level of the reference node Node_i-ref to a target voltage level is increased, the speed of enlarging the current of the inner amplifier 210 of the low dropout regulator 200 will be increased. Therefore, when the low dropout regulator 200 is switched from the standby mode to the active mode, the response speed of the low dropout regulator 200 will be increased. Therefore, the instantaneous large-voltage-drop will be reduced.

In addition, according to an embodiment of the invention, when the control signal Vint_en is changed from the second level (high level) to the first level (low level), the first PMOS P1 is disabled, the first NMOS N1 is enabled, and the voltage level of the node Node_0 is changed from the high level to the low level.

According to an embodiment of the invention, in the current regulating circuit 100, the size of the first PMOS P1 is larger than the size of the first NMOS N1 to allow the voltage level of the node Node_0 to be changed from the low level to high level instantaneously, when the control signal Vint_en is changed from the first level (low level) to the second level (high level), and allow the voltage level of the node Node_0 to be changed gradually from the high level to low level, when the control signal Vint_en is changed from the second level (high level) to the first level (low level). (as shown in FIG. 4).

Figure 4:
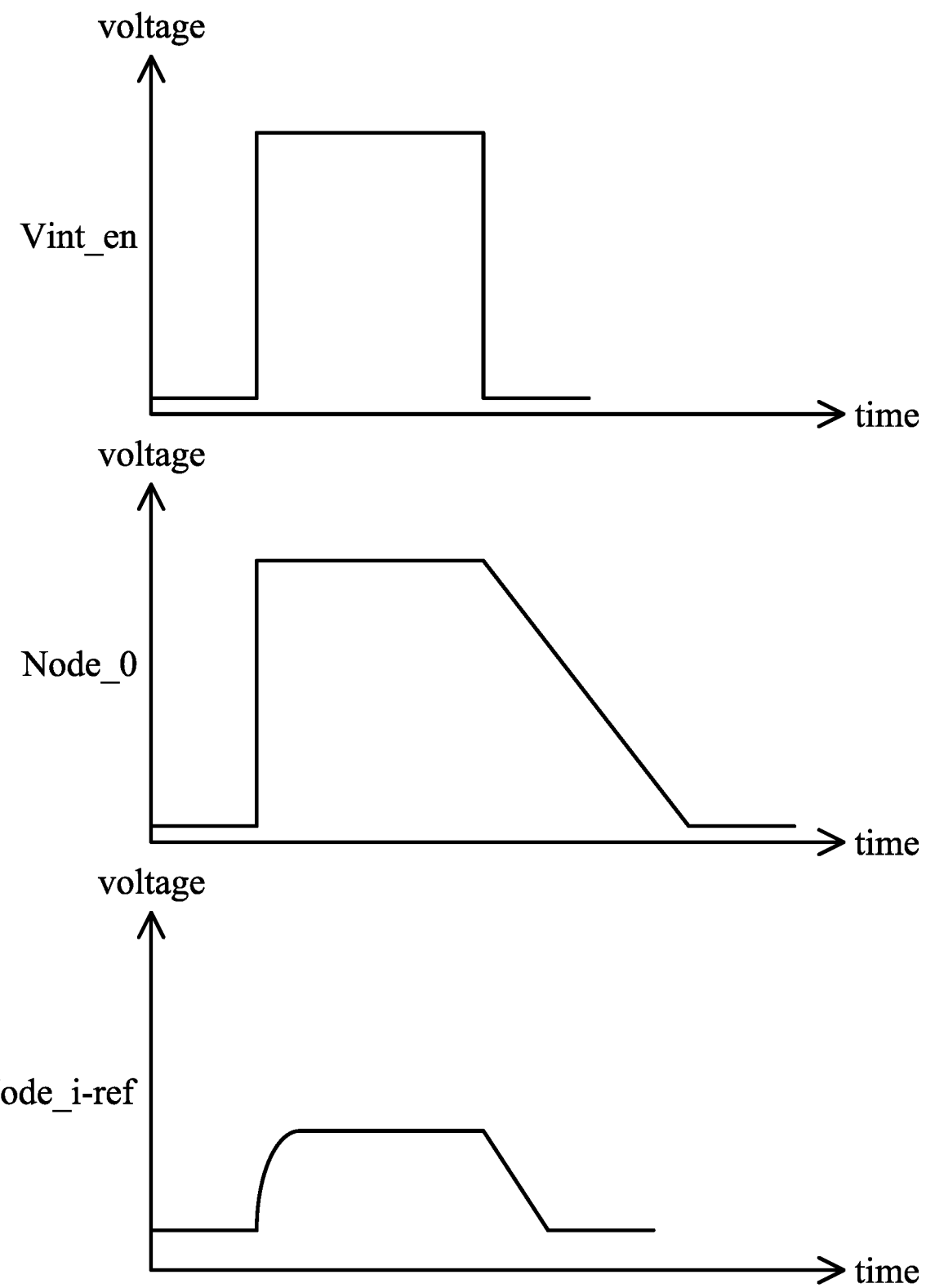
FIG. 4 is a schematic diagram of the voltage levels of the control signal Vint_en, the node Node_0 and the reference node Node_i-ref according to an embodiment of the invention.

FIG. 4 is a schematic diagram of the voltage levels of the control signal Vint_en, the node Node_0 and the reference node Node_i-ref according to an embodiment of the invention. As shown in FIG. 4, when the control signal Vint_en is changed from the low level to the high level (i.e. the low dropout regulator 200 is switched from the standby mode to the active mode), the voltage level of the node Node_0 will be changed from the low level to the high level. When voltage level of the node Node_0 is changed from the low level to the high level, the speed of pulling the voltage level of the reference node Node_i-ref to a target voltage level will be increased.

Figure 5:
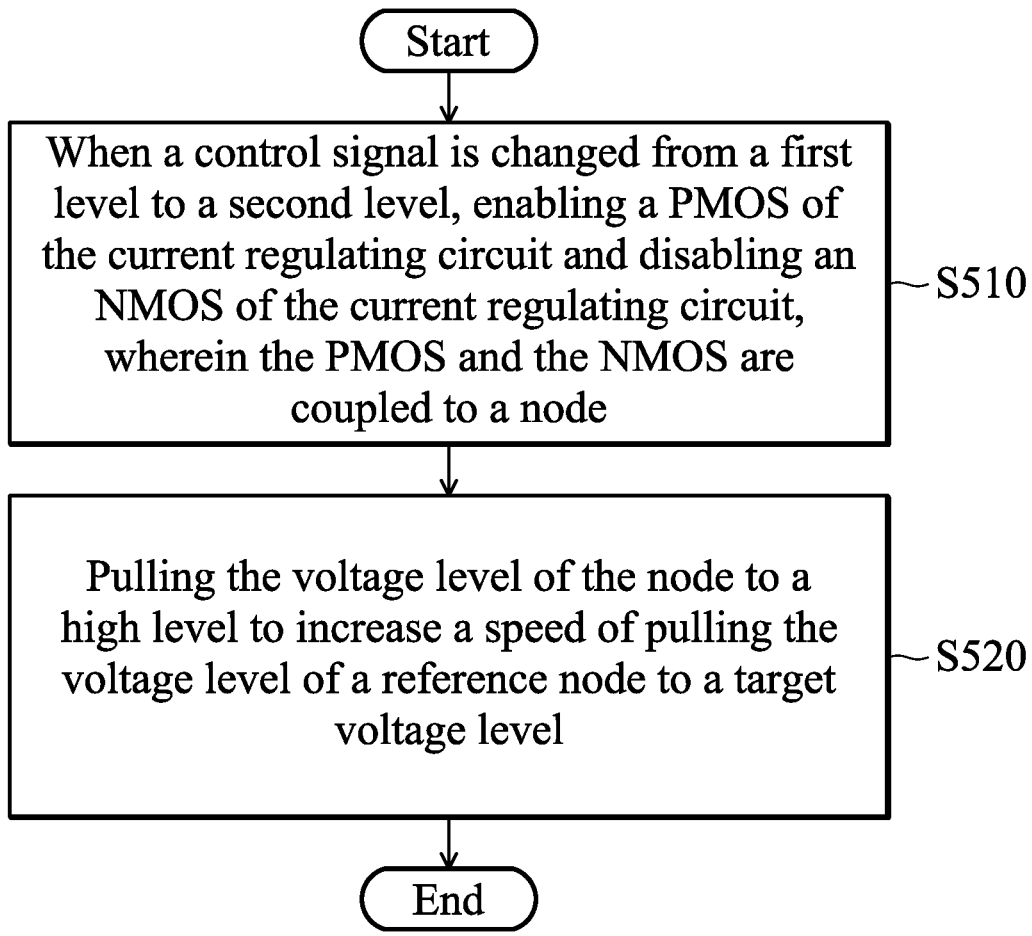
FIG. 5 is a flow chart 500 illustrating the current regulating method according to an embodiment of the invention.

FIG. 5 is a flow chart 500 illustrating the current regulating method according to an embodiment of the invention. The current regulating method is applied to the current regulating device 100 of the invention. As shown in FIG. 5, in step S510, when a control signal is changed from a first level to a second level, a PMOS of the current regulating device 100 is enabled, and an NMOS of the current regulating device 100 is disabled, wherein the PMOS and the NMOS are coupled to node Node_0. In step S520, the voltage level of the node Node_0 is pulled to a high level to increase the speed of pulling the voltage level of a reference node Node_i-ref to a target voltage level, wherein the current regulating device 100 and a low dropout regulator are coupled to the reference node Node_i-ref. When the control signal is in the first level, the low dropout regulator is in a standby mode and when the control signal is in the second level, the low dropout regulator is in an active mode.

According to an embodiment of the invention, in the current regulating method, when the control signal is changed from the second level to the first level, the PMOS of the current regulating device 100 is disabled, and the NMOS of the current regulating device 100 is enabled, and the voltage level of the node Node_0 is decreased from the high level to the low level.

According to the current regulating method provided in the embodiments of the invention, when the control signal is changed from a first level (low level) to a second level (high level), the speed of pulling the voltage level of the reference node Node_i-ref to a target voltage level can be increased by regulating the voltage level of the node Node_0 of the current regulating device 100. When the speed of pulling the voltage level of the reference node Node_i-ref to the target voltage level is increased, the speed of enlarging the inner current of the low dropout regulator 200 will also be increased. Therefore, when the low dropout regulator 200 is switched from the standby mode to the active mode, the response speed of the low dropout regulator 200 will be increased. Therefore, the instantaneous large-voltage-drop will be reduced.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A current regulating circuit, comprising:
    a first inverter, receiving a control signal;
    a second inverter, receiving the control signal;
    a PMOS, wherein a first gate of the PMOS is coupled to the first inverter;
    an NMOS, coupled to the PMOS, wherein a second gate of the NMOS is coupled to the second inverter; and
    a capacitor, coupled to the PMOS and the NMOS at a node, and coupled to a low dropout regulator at a reference node.

2. The current regulating circuit of claim 1, wherein a first drain of the PMOS is coupled to the capacitor at the node and a first source of the PMOS receives an input voltage, and wherein a second source of the NMOS is coupled to the capacitor at the node and a second drain of the NMOS is coupled to a ground.

3. The current regulating circuit of claim 1, wherein when the control signal is changed from a first level to a second level, the PMOS is enabled and the NMOS is disabled.

4. The current regulating circuit of claim 3, wherein when the PMOS is enabled, a voltage level of the node is pulled to a high level to increase a speed of pulling a voltage level of the reference node to a target voltage level.

5. The current regulating circuit of claim 3, wherein when the control signal is changed from the second level to the first level, the PMOS is disabled and the NMOS is enabled.

6. The current regulating circuit of claim 5, wherein when the NMOS is enabled, the voltage level of the node is changed from the high level to a low level.

7. The current regulating circuit of claim 6, wherein the voltage level is gradually decreased from the high level to the low level.

8. A current regulating method, applied to a current regulating circuit, and comprising:
    when a control signal is changed from a first level to a second level, enabling a PMOS of the current regulating circuit and disabling an NMOS of the current regulating circuit, wherein the PMOS and the NMOS are coupled to a node; and
    pulling a voltage level of the node to a high level to increase a speed of pulling a voltage level of a reference node to a target voltage level, wherein the current regulating circuit and a low dropout regulator are coupled to the reference node.

9. The current regulating method of claim 8, further comprising:
    when the control signal is changed from the second level to the first level, disabling the PMOS and enabling the NMOS; and
    decreasing the voltage level of the reference level from the high level to a low level.

10. The current regulating method of claim 9, further comprising:
    gradually decreasing the voltage level of the reference level from the high level to the low level.

* * * * *